US012327838B2

United States Patent
Zhou et al.

(10) Patent No.: US 12,327,838 B2
(45) Date of Patent: Jun. 10, 2025

(54) SYNCHRONOUS POLYMERIZED NON-FLAMMABLE QUASI-SOLID-STATE ELECTROLYTE FOR SOLID-STATE BATTERIES

(71) Applicant: The Hong Kong University of Science and Technology, Hong Kong (CN)

(72) Inventors: Guodong Zhou, Hong Kong (CN); Chin To Stephen Kwok, Hong Kong (CN); Jing Yu, Hong Kong (CN); Francesco Ciucci, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 602 days.

(21) Appl. No.: 17/721,378

(22) Filed: Apr. 15, 2022

(65) Prior Publication Data

US 2022/0367910 A1 Nov. 17, 2022

Related U.S. Application Data

(60) Provisional application No. 63/187,366, filed on May 11, 2021.

(51) Int. Cl.
*H01M 10/0565* (2010.01)
*H01M 4/38* (2006.01)
(Continued)

(52) U.S. Cl.
CPC ....... *H01M 10/0565* (2013.01); *H01M 4/382* (2013.01); *H01M 4/587* (2013.01);
(Continued)

(58) Field of Classification Search
None
See application file for complete search history.

(56) References Cited

U.S. PATENT DOCUMENTS 9,601,803 B2 3/2017 He et al.
9,601,805 B2 3/2017 He et al.
(Continued)

FOREIGN PATENT DOCUMENTS

CN 105914405 A 8/2016
CN 108550907 A 9/2018
(Continued)

OTHER PUBLICATIONS

Machine Translation of Chinese Patent Publication No. 105914405 (Year: 2016).*

(Continued)

*Primary Examiner* — Wyatt P McConnell
(74) *Attorney, Agent, or Firm* — Idea Intellectual Limited; Margaret A. Burke; Sam T. Yip

(57) ABSTRACT

A rechargeable battery has a cathode including a cathode active material selected from lithium iron phosphate, lithium cobalt oxide, lithium manganese oxide, lithium nickel cobalt aluminum oxide, or lithium nickel manganese cobalt oxide. An anode includes an anode active material selected from lithium, lithium titanium oxide, graphite, or silicon. A separator is positioned between the cathode and the anode. The separator is impregnated with an in-situ-formed and synchronously polymerized non-flammable quasi-solid-state electrolyte. The electrolyte is formed from a solution of monomer, lithium salt, and cross-linker. The solution wets the cathode active material and the anode active material such that the polymerized non-flammable quasi-solid-state electrolyte impregnates the cathode active material and the anode active material. The manufacturing procedures are compatible with production methods of Li-ion batteries, such as drop casting, impregnating, injecting, and printing.

15 Claims, 7 Drawing Sheets

(51) Int. Cl.
*H01M 4/587* (2010.01)
*H01M 4/02* (2006.01)
*H01M 4/485* (2010.01)
*H01M 4/505* (2010.01)
*H01M 4/525* (2010.01)
*H01M 4/58* (2010.01)
*H01M 50/489* (2021.01)

(52) U.S. Cl.
CPC ............... *H01M 2004/027* (2013.01); *H01M 2004/028* (2013.01); *H01M 4/386* (2013.01); *H01M 4/485* (2013.01); *H01M 4/505* (2013.01); *H01M 4/525* (2013.01); *H01M 4/5825* (2013.01); *H01M 50/489* (2021.01); *H01M 2300/0082* (2013.01)

(56) References Cited

U.S. PATENT DOCUMENTS

| 2015/0064574 | A1 | 3/2015 | He et al. |
| 2015/0219974 | A1 | 8/2015 | Trajkovska-Broach et al. |
| 2016/0104918 | A1 | 4/2016 | Wang |
| 2018/0277913 | A1 | 9/2018 | Pan et al. |

FOREIGN PATENT DOCUMENTS

| CN | 111435758 A | 7/2020 |
| CN | 112366361 A | 2/2021 |
| JP | 2005142024 A | 6/2005 |
| WO | 2015147282 A1 | 10/2015 |

OTHER PUBLICATIONS

Jiahua Chen et al., "Reinforcing concentrated phosphate electrolytes with in-situ polymerized skeletons for robust quasi-solid lithium metal batteries," Energy Storage Materials 25 (2020), pp. 305-312.
Dong Zhou et al., "In Situ Synthesis of a Hierarchical All-Solid-State Electrolyte Based on Nitrile Materials for High-Performance Lithium-Ion Batteries," Advanced Energy Materials 2015, 5, 1500353.
Xiaofu Xu et al., "Quasi-Solid-State Dual-Ion Sodium Metal Batteries for Low-Cost Energy Storage," Chem 6, pp. 902-909.
Ziyang Dai et al., "Highly conductive and nonflammable composite polymer electrolytes for rechargeable quasi-solid-state Li-metal batteries," Journal of Power Sources 464 (2020), 228182.
Guodong Zhou et al., "In situ formation of poly(butyl acrylate)-based non-flammable elastic quasi-solid electrolyte for dendrite-free flexible lithium metal batteries with long cycle life for wearable devices," Energy Storage Materials 34 (2021), pp. 629-639.
Hyunji Choi et al., "Nanocomposite quasi-solid-state electrolyte for high-safety lithium batteries," Nano Research, 2017.
Qiushi Sun et al., "Nonflammable quasi-solid-state electrolyte for stable lithium-metal batteries," The Royal Society of Chemistry 2019, p. 42183-42193.
Xabier Judez et al., "Solid Electrolytes for Safe and High Energy Density Lithium-Sulfur Batteries: Promises and Challenges," Journal of the Electrochemical Society, 2018, p. A6008-A6016.

* cited by examiner

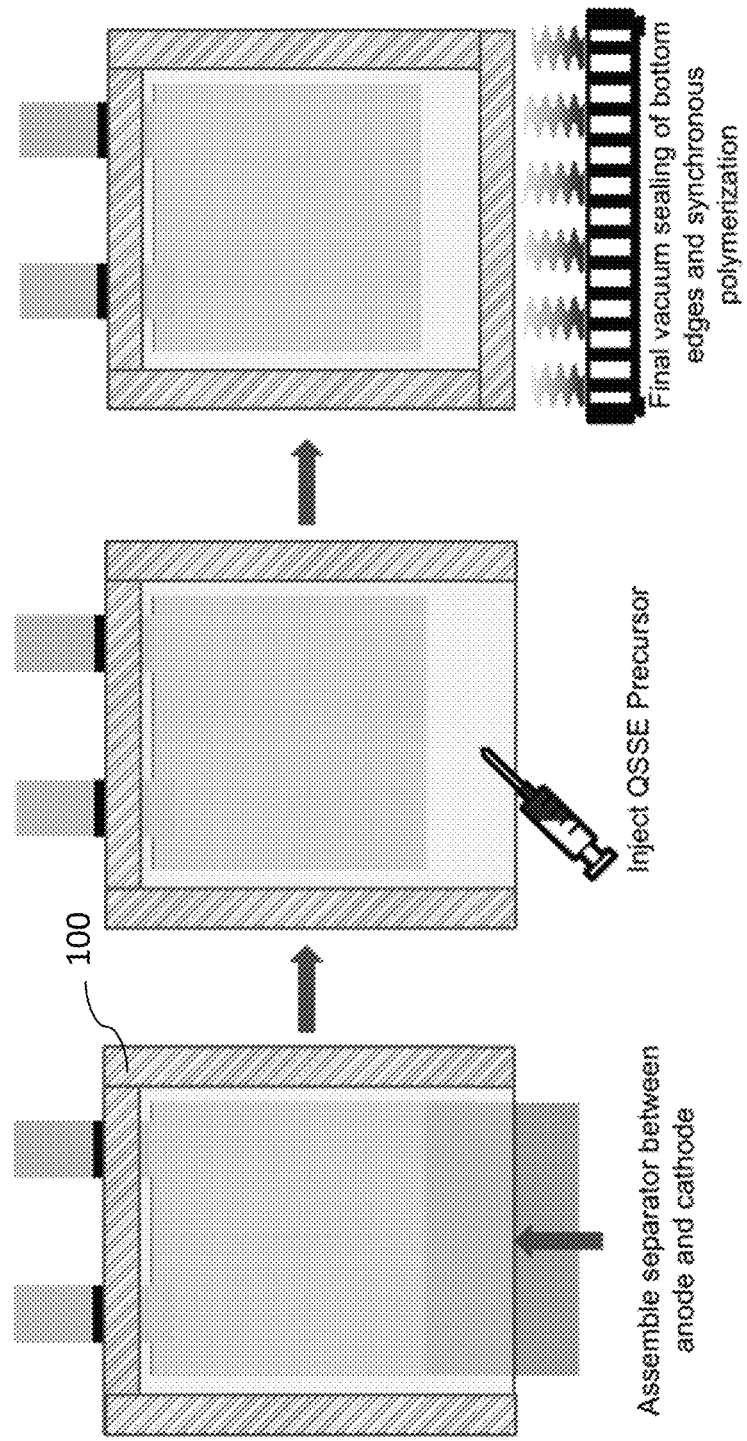

SYNCHRONOUS POLYMERIZED NON-FLAMMABLE QUASI-SOLID-STATE ELECTROLYTE FOR SOLID-STATE BATTERIES

CROSS-REFERENCE TO RELATED APPLICATION

The present application claims priority to Provisional U.S. Patent Application Ser. No. 63/187,366, filed May 11, 2021, the disclosure of which is incorporated by reference herein.

FIELD OF THE INVENTION

This invention relates to rechargeable batteries and, more particularly to rechargeable batteries including an in-situ formed, synchronously polymerized non-flammable quasi-solid-state electrolyte creating intimate contact between electrode/electrolyte interfaces.

BACKGROUND OF THE INVENTION

Lithium-ion batteries (LIBs) are widely used in small systems such as wearable electronics, mobile phones, laptop computers as well as in large systems including electric vehicles (EVs) and grid-level energy storage systems. Conventional LIBs contain liquid organic electrolytes (LOE), which are both volatile and flammable. When LIBs are not properly managed, the LOE may leak and catch fire as when the battery casing is pierced as a consequence of an accident, posing a significant risk. To improve the safety of LIBs, several strategies have been proposed. One possible solution is to replace the LOEs with inorganic ceramic-type solid-state electrolytes, which are non-flammable, non-volatile, and inert in the event of an accident. However, such ceramic-type solid-state electrolytes suffer from poor interfacial contact with the active materials. This poor solid-solid contact leads to high interfacial resistance and insufficient utilization of the active materials. The high interfacial resistance is therefore a major hurdle for the development of solid-state batteries.

To address this challenge, polymer-based solid-state electrolytes have been explored, which show better interfacial contact than the ceramic-based solid-state electrolytes. However, during battery assembly, polymer-based solid-state electrolytes only conform to a surface of the electrode active materials. Unlike conventional liquid organic electrolytes, polymeric-based solid-state electrolytes will not impregnate or infiltrate the active materials, which lowers the utilization of the electrode active materials.

U.S. Pat. No. 9,601,805 describes a quasi-solid electrolyte with high Li salt concentration coated on a separator for Li—S batteries. US Patent Application Pub. No. US 2015/0064574A1 also uses a high concentration of alkali metal salts for Na and K batteries. However, in both patents, there was no in situ process involved, therefore, the solid-state electrolyte is not impregnated into the active materials.

US Patent Application Pub. No. US 2015/0219974 uses an in situ process for an electrolyte layer on an electrochromic device. US Patent Application Pub. No. US 2018/0277913 uses a highly concentrated salt (1M to 5M) in a liquid solvent to prepare a quasi-solid electrolyte soaked in a separator but no in situ process is involved. China Patent Application Pub. No. CN105914405A uses an in situ process for preparing a solid-state electrolyte for batteries based only on epoxy. China Patent Application Pub. No. CN105914405A prepares an in situ interlayer with a composite polymer electrolyte containing ceramic fillers. However, the battery uses no separator and requires ceramic fillers to compensate for the lack of separator. China Patent Application Pub. No. CN108550907A uses an in situ process for preparing an interlayer without using a separator. This process requires an extra step for fabricating a composite polymer electrolyte with ceramic filler.

Thus, there is a need in the art for improved rechargeable batteries with in situ formed polymer electrolytes.

SUMMARY OF THE INVENTION

Therefore, there is a strong need to develop a synchronous process and composition that allows the polymer-based solid-state electrolyte to wet the active materials during packaging. Such a fabrication method reduces interfacial resistance, increases the utilization of electrode active materials, and is compatible with the current manufacturing methods for lithium ion batteries.

The present invention addresses this need by providing a synchronous process for producing non-flammable quasi-solid-state electrolyte that demonstrate good RT ionic conductivity, improved safety, and excellent performance in a solid-state energy storage system.

In one aspect, the present invention provides a rechargeable battery having a cathode including a cathode active material selected from lithium iron phosphate, lithium cobalt oxide, lithium manganese oxide, lithium nickel cobalt aluminum oxide, or lithium nickel manganese cobalt oxide. An anode includes an anode active material selected from lithium, lithium titanium oxide, graphite, or silicon. A separator is positioned between the cathode and the anode. The separator is impregnated with an elastic in-situ-formed and synchronously polymerized non-flammable quasi-solid-state electrolyte. The electrolyte is formed from a solution of monomer, lithium salt, and cross-linker. The solution wets the cathode active material and the anode active material such that the polymerized non-flammable quasi-solid-state electrolyte impregnates the cathode active material and the anode active material.

In a further embodiment, the cathode active material is present in an amount of from 80% to 99.99% by weight of the total weight of the cathode composition.

In a further embodiment, the anode active material is present in an amount of from 80% to 99.99% by weight of the total weight of the anode composition.

In a further embodiment, the quasi-solid-state electrolyte is in an amount from 0.01% to 20% by weight, based on the total weight of cathode plus anode composition.

In a further embodiment, the solution further comprises a flame retardant additive.

In a further embodiment, the monomers are selected from butyl acrylate, propyl acrylate, ethyl acrylate, methyl acrylate, butyl methacrylate, propyl methacrylate, ethyl methacrylate, methyl methacrylate, methoxy poly(ethylene glycol) methacrylate, vinyl acetate, ethyl cyanoacrylate, or methyl cyanoacrylate.

In a further embodiment, the lithium salt is selected from lithium nitrate, lithium perchlorate, lithium bis(trifluoromethylsulfonyl)imide, lithium bis(fluorosulfonyl)imide, lithium trifluoromethanesulfonate, lithium trifluoroacetate, lithium bis(oxalato)borate, lithium difluoro(oxalato)borate lithium tetrafluoroborate, lithium hexafluorophosphate, lithium chloride, lithium bromide, or lithium iodide, in an amount of from 10% to 40% by weight of the non-flammable quasi-solid-state electrolyte.

In a further embodiment, the cross-linker is selected from polyethylene glycol dimethacrylate, poly(ethylene glycol) diacrylate, trimethylolpropane ethoxyl atetriacrylate, trimethylolpropane propoxyl atetriacrylate, pentaerythritol tetraacrylate, ethoxylated pentaerythritol tetraacrylate in an amount of from 0.1% to 10% by mole of the monomer.

In a further embodiment, the thermal initiator is selected from azobisisobutyronitrile, azobis(2,4-dimethylvaleronitrile), dimethyl azobis(2-methylpropionate), 2-butanone peroxide, dibenzoyl peroxide, or tert-butyl peroxybenzoate in an amount of from 0.1% to 1% by mole of the monomer.

In a further embodiment, one or more additives are included in the solution and are selected from trimethyl phosphate, triethyl phosphate, tributyl phosphate, triphenyl phosphate, tris(trimethylsilyl) phosphate, fluoroethylene carbonate, fluoroethyl methyl carbonate, propylene carbonate, ethylene carbonate, dimethyl carbonate, diethyl carbonate, ethylmethyl carbonate, vinylene carbonate, acetonitrile, succinonitrile, glutaronitrile, adiponitrile, ethyl acetate, or methyl propionate in an amount from 1% to 40% by weight of the non-flammable quasi-solid-state electrolyte.

In a further embodiment, the separator is a glass fiber, polypropylene, polyethylene, cellulose, cellulose acetate, polyamide, polyimide, poly(vinylidene fluoride), polytetrafluoroethylene, poly(vinylidene fluoride-co-hexafluoropropylene), polyacrylonitrile, poly(methyl methacrylate), or nano-fiber based separator.

In a further embodiment, the thickness of the separator is in the range from 0.01 mm to 0.5 mm.

In another aspect, the present invention provides a method of making a rechargeable battery. The method includes forming a cathode including a cathode active material selected from lithium iron phosphate, lithium cobalt oxide, lithium manganese oxide, lithium nickel cobalt aluminum oxide, or lithium nickel manganese cobalt oxide. An anode is formed including an anode active material selected from lithium, lithium titanium oxide, graphite, or silicon. A separator is positioned between the cathode and the anode. A solution is applied that includes monomer, lithium salt, and cross-linker. The solution wets the cathode active material and the anode active material. In situ and synchronous polymerization is performed to form a non-flammable quasi-solid-state electrolyte impregnated into the cathode active material and the anode active material.

In a further embodiment, the solution is prepared by a solution mixing or colloidal dispersion method.

In a further embodiment, the solution is applied by drop casting, impregnation, injection, or printing.

In a further embodiment, the synchronous polymerization is performed at temperature in a range from 40° C. to 80° C.

BRIEF DESCRIPTION OF DRAWINGS

FIGS. 3A-3C schematically depicts the synchronous process for producing a solid-state battery. The synchronous process is compatible with current production methods of lithium ion batteries.

DETAILED DESCRIPTION

A lithium ion battery is formed that includes a non-flammable quasi-solid-state electrolyte (NF-QSSE) formed in situ by a synchronous process. The synchronous process is fully compatible with the current production methods of Li-ion batteries. The synchronous polymerization process can effectively reduce the thickness of the NF-QSSEs and at the same time, provide intimate contact with the electrode active materials in the batteries by infiltrating the active materials in a liquid state prior to polymerization. As a result, the synchronous process can significantly reduce the interfacial resistance between the electrode/electrolyte interfaces. The non-flammable ionically conductive polymer matrix of the solid-state electrolyte improves the safety of the solid-state batteries. The as-produced NF-QSSE has good room temperature (RT) ionic conductivity (over $10^{-4}$ S cm$^{-1}$), flexibility, and improved safety, providing an improved industrially-scalable technique for producing solid-state batteries.

As used herein, the expression "quasi-solid-state electrolyte" relates to an electrolyte that forms a solid matrix that includes a portion of liquid component immobilized inside the solid matrix.

Figure 2A:
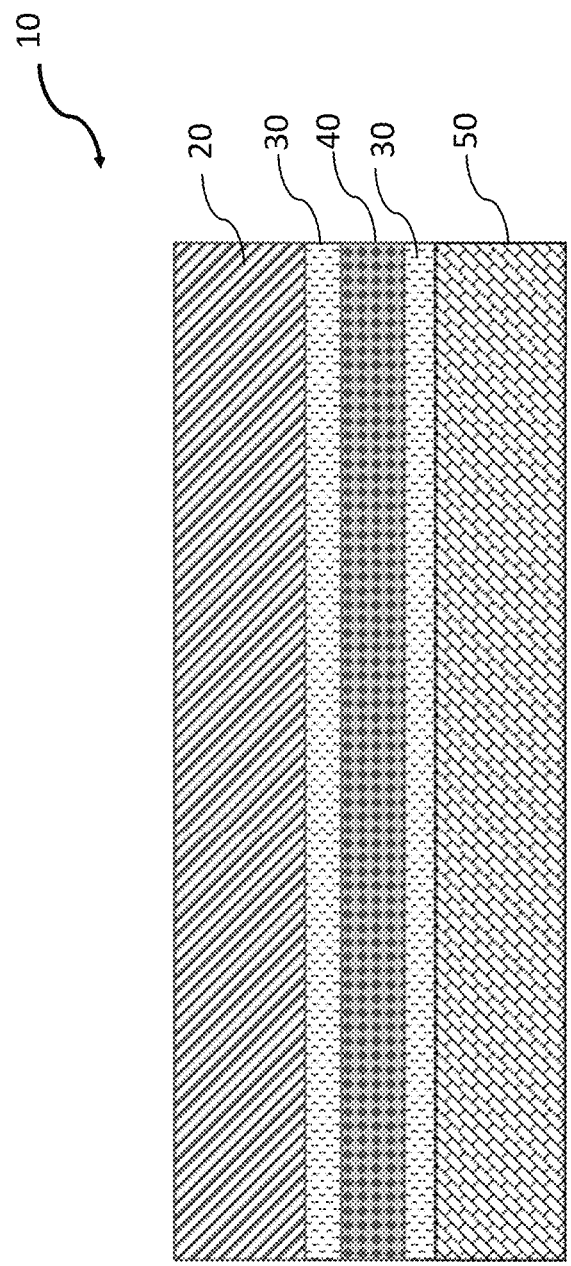
FIG. 2A is a schematic diagram of a solid-state battery using the synchronous non-flammable quasi-solid-state electrolyte.

FIG. 2A schematically depicts a battery 10 according to the present invention. The battery includes a cathode 20. The cathode active material is a lithium-containing material and may be selected from any of a variety of lithium compounds. Exemplary lithium compounds include, but are not limited to, lithium iron phosphate, lithium cobalt oxide, lithium manganese oxide, lithium nickel cobalt aluminum oxide, lithium nickel manganese cobalt oxide.

The battery 10 further includes anode 50. Anode 50 may be one or more of lithium, lithium titanium oxide, graphite, or silicon. Significantly, batteries formed according to the present invention may use lithium metal as the anode, greatly increasing the energy density of the battery, without the tendency to form dendrites that are related to battery shorts and potential fires. The active materials of the cathode and anode are in an amount of from 80% to 99.99% by weight based on the total weight of the electrodes.

Positioned in between the cathode 20 and anode 50 is separator 40. Separator 40 may be selected from a variety of commercially-available battery separators such as glass fiber, polypropylene, polyethylene, cellulose, cellulose acetate, polyamide, polyimide, poly(vinylidene fluoride), polytetrafluoroethylene, poly(vinylidene fluoride-co-hexafluoropropylene), polyacrylonitrile, poly(methyl methacrylate), or nano-fiber based separators. Composite separators that include plural layers of these materials may also be used as well as separators that include additional structural elements such as ceramic particles. For thin, optionally flexible, batteries, the thickness of the separator may be in a range from 0.01 mm to 0.5 mm.

Infiltrating the separator 40 and the cathode and anode materials of cathode 20 and anode 50 is a non-flammable quasi-solid-state electrolyte 30 that is injected into the space between the anode and the cathode as well as the pores inside the separator as a precursor liquid followed by in situ polymerization. The quasi-solid-state electrolyte is 0.01% to 20% by weight based on the total weight of battery electrodes. By using a precursor liquid, the liquid infiltrates and wets the separator, completely filling the separator pores, as well as wetting the cathode and anode materials, creating intimate contact with the cathode and anode materials. As the in situ polymerization is performed following this infiltration, the quasi-solid-state electrolyte is formed in the same spaces infiltrated by the liquid. This intimate contact reduces the interfacial resistance and improves the utilization of the cathode and anode active materials. Further, the quasi-solid nature of the electrolyte creates a spatially even current distribution on the electrodes, impeding the formation of dendrites.

The liquid precursor of the quasi-solid-state electrolyte includes a monomer that will form the polymer matrix and a thermal initiator. Exemplary monomers include butyl acrylate, propyl acrylate, ethyl acrylate, methyl acrylate, butyl methacrylate, propyl methacrylate, ethyl methacrylate, methyl methacrylate, methoxy poly(ethylene glycol) methacrylate, vinyl acetate, ethyl cyanoacrylate, or methyl cyanoacrylate. Exemplary thermal initiators include azobisisobutyronitrile, azobis(2,4-dimethylvaleronitrile), dimethyl azobis(2-methylpropionate), 2-butanone peroxide, dibenzoyl peroxide, or tert-butyl peroxybenzoate.

The liquid precursor further includes one or more lithium salts in an amount of from 10% to 40% by weight of the electrolyte. These salts may be selected from any lithium ion-containing salt (including combinations) such as lithium nitrate, lithium perchlorate, lithium bis(trifluoromethylsulfonyl)imide, lithium bis(fluorosulfonyl)imide, lithium trifluoromethanesulfonate, lithium trifluoroacetate, lithium bis(oxalato)borate, lithium difluoro(oxalato)borate lithium tetrafluoroborate, lithium hexafluorophosphate, lithium chloride, lithium bromide, or lithium iodide.

The liquid precursor further includes a cross-linker compatible with the selected monomer in an amount typically from 0.1% to 10% by mole of the monomer. The cross-linker may be one or more of poly(ethylene glycol) dimethacrylate, poly(ethylene glycol) diacrylate, trimethylolpropane ethoxylate triacrylate, trimethylolpropane propoxylate triacrylate, pentaerythritol tetraacrylate, or ethoxylated pentaerythritol tetraacrylate.

To improve the safety of the solid-state battery, flame-retarding additives may be included in the liquid precursor and polymerized into the quasi-solid-state electrolyte. These include trimethyl phosphate, triethyl phosphate, tributyl phosphate, triphenyl phosphate, or tris(trimethylsilyl) phosphate.

Further additives may be included in the liquid precursor such as fluoroethylene carbonate, fluoroethyl methyl carbonate, propylene carbonate, ethylene carbonate, dimethyl carbonate, diethyl carbonate, ethylmethyl carbonate, vinylene carbonate, acetonitrile, succinonitrile, glutaronitrile, adiponitrile, ethyl acetate, or methyl propionate. The total amount of additives (flame retardant plus other additives) may be used in an amount of from 1% to 40% of the total weight of the quasi-solid-state electrolyte.

To fabricate the batteries of the present invention, the cathode and anode are fabricated using any known technique such as casting a slurry of active materials onto a current collector for the lithium compound of the cathode. For the cathode, particulates may be cast onto a current collector or a sheet or, for example, lithium metal may be used. The assembled cathode and anode are incorporated into a battery housing such as a metal shell or a pouch. The separator is positioned between the cathode and anode within battery casing/pouch 100 as depicted in FIG. 3A.

The liquid electrolyte precursor is formed by mixing or colloidal dispersion of a desired amount of monomer, lithium salts, cross-linker, thermal initiator, and additives to form a precursor mixture at room temperature. The electrolyte liquid precursor is then injected into the battery casing/pouch 100 by any conventional technique such as injection or other impregnation process as seen in FIG. 3B. Alternatively, the liquid precursor may be drop cast onto the separator. As seen in FIG. 3C, the battery assembly may be sealed followed by synchronous polymerization at a temperature range from approximately 40° C. to approximately 80° C. for approximately 0.5 hours to approximately 20 hours in an oven. After cooling down to room temperature, the obtained solid-state battery is ready for use. The room temperature ionic conductivity of the synchronous quasi-solid-state electrolyte is greater than approximately $10'$S cm$^{-1}$, and the electrochemical stability window of the material is up to 4.5V vs. Li/Li$^+$.

EXAMPLES

Example 1

Figure 1A:
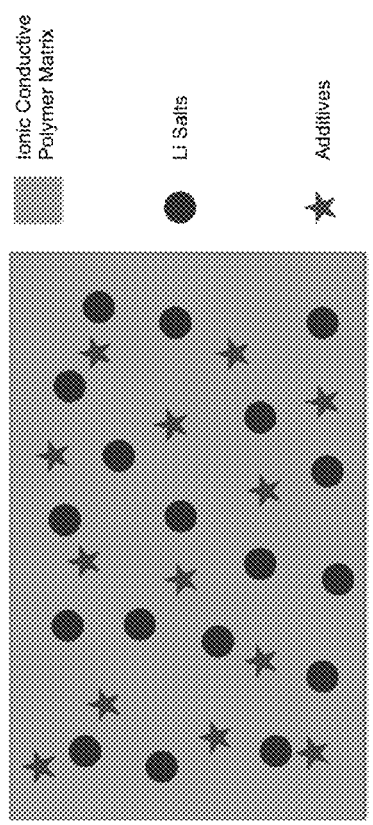
FIG. 1A is a schematic diagram showing the composition of the synchronous non-flammable quasi-solid-state electrolyte of the present invention.

The synchronous non-flammable quasi-solid-state electrolyte is prepared by mixing the monomer, Li salts, cross-linker, thermal initiator, and additives at room temperature to form a precursor mixture. The precursor may be drop-casted, impregnated or printed on the separator surface. After polymerization for 12 hours at a temperature in the range of 40° C. to 80° C., a free-standing membrane with the separator as support can be formed with a thickness in the range of 0.01 mm to 0.5 mm. The schematic of the components in the synchronous non-flammable quasi-solid-state electrolyte is depicted in FIG. 1A. Four synchronous non-flammable quasi-solid-state electrolyte with 20%, 30%, 40%, and 50% by weight of PBA denoted by PBA20, PBA30, PBA40, PBA50 respectively are prepared using a polypropylene separator as support.

Figure 1B:
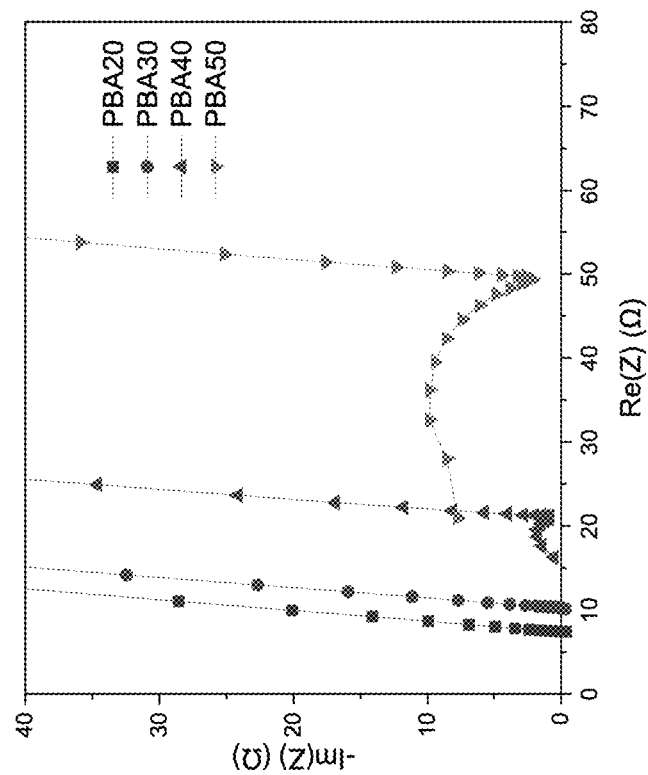
FIG. 1B is a RT Nyquist plot of synchronous non-flammable quasi-solid-state electrolyte PBA20, PBA30, PBA40, and PBA50. The calculated RT ionic conductivities of the synchronous NF-QSSEs are $4.2 \times 10^{-4}$ S cm$^{-1}$, $3.1 \times 10^{-4}$ S cm$^{-1}$, $1.5 \times 10^{-4}$ S cm$^{-1}$ and $6.3 \times 10^{-5}$ S cm$^{-1}$ respectively.

The resulting free-standing NF-QSSEs were tested for room temperature ionic conductivity by electrochemical impedance spectroscopy (EIS). The testing results are shown in FIG. 1B. The ionic conductivity ($\sigma$) was calculated by $\sigma=l/RA$, where $\sigma$ is the ionic conductivity, l is the thickness of the non-flammable quasi-solid-state electrolyte membrane, R is the bulk resistance, and A is the cross-sectional area of the electrode. The room temperature ionic conductivities of PBA20, PBA30, PBA40, PBA50 are calculated to be $4.2 \times 10^{-4}$ S cm$^{-1}$, $3.1 \times 10^{-4}$ S cm$^{-1}$, $1.5 \times 10^{-4}$ S cm$^{-1}$ and $6.3 \times 10^{-5}$ S cm$^{-1}$ respectively. The ionic conductivity of PBA20 enables the solid-state battery to be operated at room temperature.

Example 2

The electrochemical stability of the synchronous non-flammable quasi-solid-state electrolyte can be evaluated by assembling it with electrodes. The schematic of the battery assembly is shown in FIG. 2A where the cathode is stainless steel and the anode is lithium metal. The electrochemical stability was tested by cyclic voltammetry (CV) and linear sweep voltammetry (LSV).

Figure 2B:
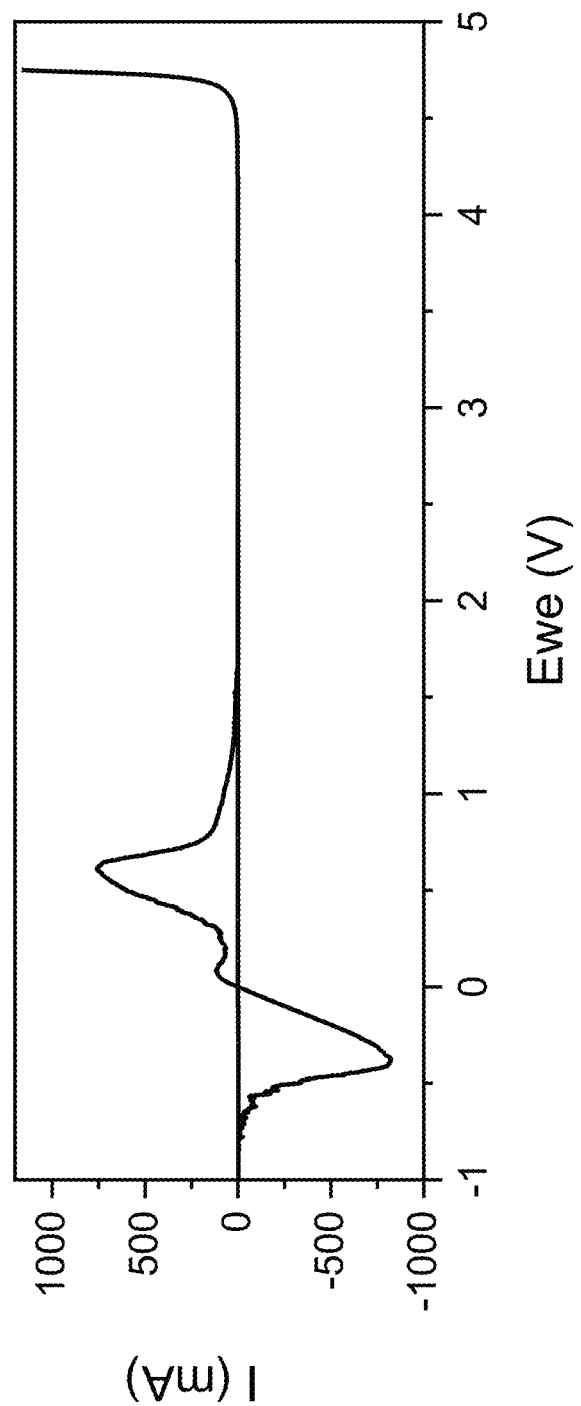
FIG. 2B is the cyclic voltammetry (CV) and linear sweep voltammetry (LSV) test of PBA20. PBA20 demonstrates electrochemical stability up to 4.5V vs. Li/Li$^+$.

FIG. 2B shows the electrochemical stability of PBA20 which shows no noticeable oxidation peak until 4.5V (vs. Li/Li$^+$). The result demonstrates that PBA20 is electrochemically stable and compatible with the most common electrode materials such as lithium, lithium titanium oxide, graphite, silicon, lithium iron phosphate, lithium cobalt oxide, lithium manganese oxide, lithium nickel cobalt aluminum oxide, and lithium nickel manganese cobalt oxide.

Example 3

The synchronous process to prepare the solid-state battery is depicted in FIGS. 3A-3C. The process starts with assembling of anode, cathode, and separator, similar to the conventional manufacturing process of Li-ion batteries. After that the precursor mixture from Example 1 is injected into the battery assembly, followed by vacuum sealing of the battery package. The assembled battery is subjected to synchronous polymerization at a range of temperatures from 40° C. to 80° C. for 0.5 hours to 20 hours. The solid state battery is obtained after cooling down to room temperature.

Figure 3D:
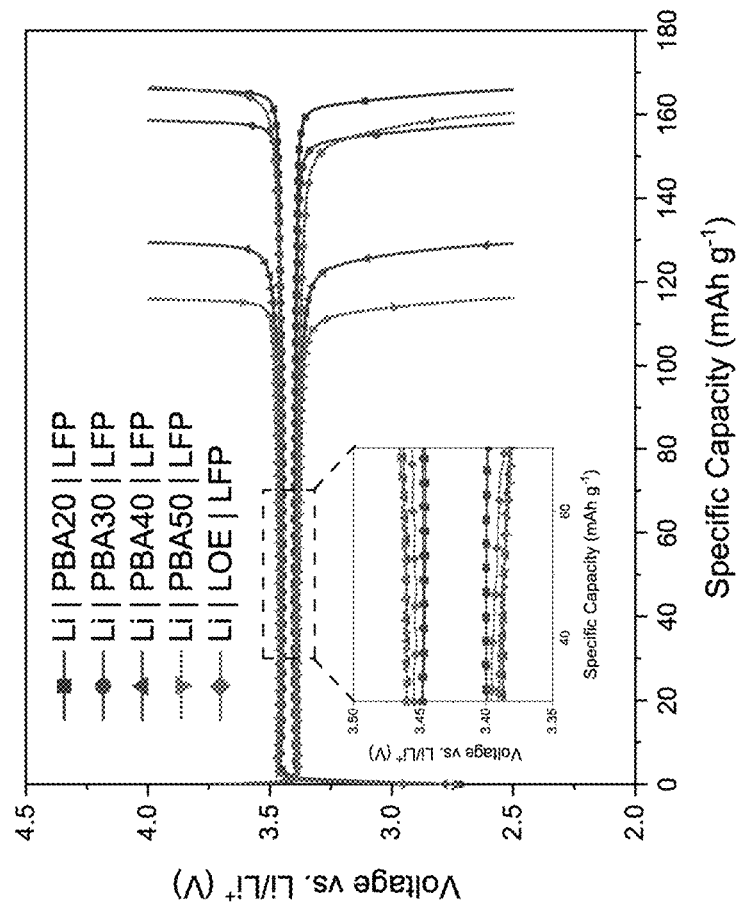
FIG. 3D is the solid-state battery performance using PBA20, PBA30, PBA40, and PBA50 as the non-flammable quasi-solid-state electrolyte.

To evaluate the battery performance of the solid-state battery with the synchronous non-flammable quasi-solid-state electrolyte, four solid-state batteries using PBA20, PBA30, PBA40, and PBA50 are prepared and investigated in the voltage range of 2.5V to 4V. In addition, a battery using a conventional liquid organic electrolyte was also prepared for comparison. Li was the anode and LFP was the cathode. FIG. 3D shows the charge/discharge profile of batteries using synchronous non-flammable quasi-solid-state electrolyte and liquid organic electrolyte at 0.1 C. SSB with PBA20, PBA30, PBA40, PBA50 demonstrate a discharge capacity of 165 mAhg$^{-1}$, 160 mAhg$^{-1}$, 130 mAhg$^{-1}$ and 120 mAhg$^{-1}$ respectively. The solid-state battery with PBA20 demonstrates a comparable performance with a conventional Li-ion battery using liquid organic electrolyte. The results demonstrate the synchronous process is compatible with the current production method of Li-ion batteries, and has the ability to scale for commercial production.

Example 4

Figure 4:
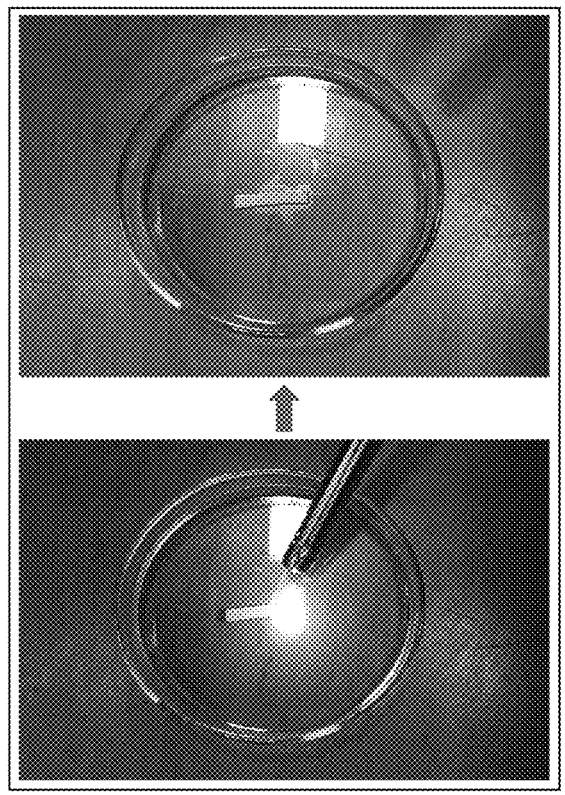
FIG. 4 demonstrates that the synchronous non-flammable quasi-solid-state electrolyte is non-flammable even with direct exposure to a flame.

To improve the safety of the solid-state battery, flame-retardants such as trimethyl phosphate, triethyl phosphate, tributyl phosphate, triphenyl phosphate, or tris(trimethylsilyl) phosphate are incorporated into the synchronous non-flammable quasi-solid-state electrolyte as additives. To demonstrate the non-flammability, the synchronous non-flammable quasi-solid-state electrolyte with flame-retardant is directly exposed to a flame as shown in FIG. 4. The synchronous non-flammable quasi-solid-state electrolyte does not catch fire even under direct exposure to a burning flame.

As used herein, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all the ranges disclosed in the present disclosure include endpoints. The term "substantially coplanar" may refer to two surfaces within a few micrometers (µm) positioned along the same plane, for example, within 10 µm, within 5 µm, within 1 µm, or within 0.5 µm located along the same plane. When reference is made to "substantially" the same numerical value or characteristic, the term may refer to a value within ±10%, ±5%, ±1%, or ±0.5% of the average of the values.

Several embodiments of the present disclosure and features of details are briefly described above. The embodiments described in the present disclosure may be easily used as a basis for designing or modifying other processes and structures for realizing the same or similar objectives and/or obtaining the same or similar advantages introduced in the embodiments of the present disclosure. Such equivalent construction does not depart from the spirit and scope of the present disclosure, and various variations, replacements, and modifications can be made without departing from the spirit and scope of the present disclosure.

The invention claimed is:

1. A rechargeable battery comprising:
    a cathode including a cathode active material selected from lithium iron phosphate, lithium cobalt oxide, lithium manganese oxide, lithium nickel cobalt aluminum oxide, or lithium nickel manganese cobalt oxide;
    an anode including an anode active material selected from lithium, lithium titanium oxide, graphite, or silicon;
    a separator positioned between the cathode and the anode, the separator being impregnated with an elastic in situ and synchronously polymerized non-flammable quasi-solid-state electrolyte formed from a solution of monomer, lithium salt, and cross-linker, the solution wetting the cathode active material and the anode active material such that the formed non-flammable quasi-solid-state electrolyte impregnates the cathode active material and the anode active material;
    wherein the monomers are selected from butyl acrylate, propyl acrylate, ethyl acrylate, methyl acrylate, butyl methacrylate, propyl methacrylate, ethyl methacrylate, methyl methacrylate, methoxy poly (ethylene glycol) methacrylate, vinyl acetate, ethyl cyanoacrylate, or methyl cyanoacrylate.

2. The rechargeable battery of claim 1 wherein the cathode active material is present in an amount of from 80% to 99.99% by weight of the total weight of the cathode composition.

3. The rechargeable battery of claim 1 wherein the anode active material is present in an amount of from 80% to 99.99% by weight of the total weight of the anode composition.

4. The rechargeable battery of claim 1, wherein the quasi-solid-state electrolyte is in an amount from 0.01% to 20% by weight, based on the total weight of cathode plus anode composition.

5. The rechargeable battery of claim 1, wherein the solution further comprises a flame retardant additive.

6. The rechargeable battery of claim 1, wherein the lithium salt is selected from lithium nitrate, lithium perchlorate, lithium bis(trifluoromethylsulfonyl) imide, lithium bis (fluorosulfonyl) imide, lithium trifluoromethanesulfonate, lithium trifluoroacetate, lithium bis (oxalato) borate, lithium difluoro (oxalato) borate lithium tetrafluoroborate, lithium hexafluorophosphate, lithium chloride, lithium bromide, or lithium iodide, in an amount of from 10% to 40% by weight of the non-flammable quasi-solid-state electrolyte.

7. The rechargeable battery of claim 1, wherein the cross-linker is selected from poly (ethylene glycol) dimethacrylate, poly (ethylene glycol) diacrylate, trimethylolpropane ethoxylate triacrylate, trimethylolpropane propoxylate triacrylate, pentaerythritol tetraacrylate, or ethoxylated pentaerythritol tetraacrylate in an amount of from 0.1% to 10% by mole of the monomer.

8. The rechargeable battery of claim 1, wherein the thermal initiator is selected from azobisisobutyronitrile, azobis (2,4-dimethylvaleronitrile), dimethyl azobis (2-methylpropionate), 2-butanone peroxide, dibenzoyl peroxide, or tert-butyl peroxybenzoate in an amount of from 0.1% to 1% by mole of the monomer.

9. The rechargeable battery of claim 1, further comprising one or more additives selected from trimethyl phosphate, triethyl phosphate, tributyl phosphate, triphenyl phosphate, tris (trimethylsilyl) phosphate, fluoroethylene carbonate, fluoroethyl methyl carbonate, propylene carbonate, ethylene carbonate, dimethyl carbonate, diethyl carbonate, ethylmethyl carbonate, vinylene carbonate, acetonitrile, succinonitrile, glutaronitrile, adiponitrile, ethyl acetate, or methyl propionate in an amount from 1% to 40% by weight of the non-flammable quasi-solid state electrolyte.

10. A rechargeable battery comprising:
   a cathode including a cathode active material selected from lithium iron phosphate, lithium cobalt oxide, lithium manganese oxide, lithium nickel cobalt aluminum oxide, or lithium nickel manganese cobalt oxide;
   an anode including an anode active material selected from lithium, lithium titanium oxide, graphite, or silicon;
   a separator positioned between the cathode and the anode, the separator being impregnated with an elastic in situ and synchronously polymerized non-flammable quasi-solid-state electrolyte formed from a solution of monomer, lithium salt, and cross-linker, the solution wetting the cathode active material and the anode active material such that the formed non-flammable; wherein the separator is a glass fiber, polypropylene, polyethylene, cellulose, cellulose acetate, polyamide, polyimide, poly (vinylidene fluoride), polytetrafluoroethylene, poly (vinylidene fluoride-co-hexafluoropropylene), polyacrylonitrile, poly (methyl methacrylate), or nano-fiber based separator.

11. The rechargeable battery of claim 10, where the thickness of the separator is in the range from 0.01 mm to 0.5 mm.

12. A method of making a rechargeable battery comprising:
   forming a cathode including a cathode active material selected from lithium iron phosphate, lithium cobalt oxide, lithium manganese oxide, lithium nickel cobalt aluminum oxide, or lithium nickel manganese cobalt oxide;
   forming an anode including an anode active material selected from lithium, lithium titanium oxide, graphite, or silicon;
   positioning a separator between the cathode and the anode;
   applying a solution of monomer, lithium salt, and cross-linker, the solution wetting the cathode active material and the anode active material, performing in situ and synchronous polymerization to form a non-flammable quasi-solid-state electrolyte in intimate contact with the cathode active material and the anode active material.

13. The method of claim 12, wherein the solution is prepared by a solution mixing or colloidal dispersion method.

14. The method of claim 12, wherein the solution is applied by drop casting, impregnation, injection, or printing.

15. The method of claim 12, wherein the synchronous polymerization is performed at temperature in a range from 40° C. to 80° C.

* * * * *